United States Patent

Mørch

[11] Patent Number: 5,975,838
[45] Date of Patent: Nov. 2, 1999

[54] DEVICE FOR DESTACKING AND CONVEYING STICKS IN AN APPARATUS FOR INSERTING STICKS IN ICE-CREAM BODIES

[75] Inventor: Ole Mørch, Svendborg, Denmark

[73] Assignee: NTC Engineering APS, Herlev, Denmark

[21] Appl. No.: 08/875,576
[22] PCT Filed: Jan. 26, 1995
[86] PCT No.: PCT/DK95/00038
§ 371 Date: Jul. 24, 1997
§ 102(e) Date: Jul. 24, 1997
[87] PCT Pub. No.: WO96/22697
PCT Pub. Date: Aug. 1, 1996

[51] Int. Cl.⁶ .................................................. B65G 59/06
[52] U.S. Cl. ...................................... 414/797.7; 221/277
[58] Field of Search ........................ 221/277; 414/797.6, 414/797.7, 797.9

[56] References Cited

U.S. PATENT DOCUMENTS

| | | |
|---|---|---|
| 1,953,506 | 4/1934 | Schnaier . |
| 2,684,161 | 7/1954 | Fay ...................................... 414/797.7 |
| 2,878,962 | 3/1959 | Chaney et al. ...................... 221/277 X |
| 3,221,673 | 12/1965 | Shelly . |
| 3,478,703 | 11/1969 | Peppler et al. . |
| 4,105,384 | 8/1978 | Mørch ................................. 425/125 S |
| 4,323,336 | 4/1982 | Harper et al. ........................ 425/126 S |
| 4,801,063 | 1/1989 | Mørch ........................................ 227/45 |
| 4,976,597 | 12/1990 | Schultz ................................. 425/126.2 |
| 5,383,761 | 1/1995 | Fluck ............................... 414/797.7 X |

FOREIGN PATENT DOCUMENTS

| | | |
|---|---|---|
| 1 601 078 | 6/1970 | Germany . |
| 2835234 | 3/1979 | Germany . |
| 3004819 | 9/1980 | Germany . |

Primary Examiner—Janice L. Krizek
Attorney, Agent, or Firm—Larson & Taylor

[57] ABSTRACT

In a device for destacking and conveying sticks to be inserted into ice-cream bodies in an apparatus of the kind, in which the sticks are supplied in the form of an elongate stack of sticks in guide means (5, 6, P), from which the sticks are destacked singly adjacent to a carrier (7, 8) moving past the exit aperture (12) of the guide means (6, P), the destacking means is in the form of a rotor (7) with teeth resembling those of a ratchet wheel. With this arrangement, the sticks are destacked quickly and reliably, making it possible to achieve high operating rates, either when the sticks are placed directly in front of an ice-cream body, or when the sticks are inserted in pockets on a carrier belt (8). In the latter case, said belt (8) may have pockets or fingers with a substantially greater depth or height, respectively, than the thickness of an ice-lolly stick, so that the stick is held more securely during the further conveying.

20 Claims, 2 Drawing Sheets

DEVICE FOR DESTACKING AND CONVEYING STICKS IN AN APPARATUS FOR INSERTING STICKS IN ICE-CREAM BODIES

TECHNICAL FIELD

The present invention relates to a device for separating and conveying sticks, and more particularly to the use of such a device in an apparatus for inserting sticks in ice-cream bodies.

BACKGROUND ART

Danish Patent Application No. 1832/86 discloses an apparatus of the kind referred to. The apparatus according to Danish Patent Application No. 1832/86 is intended to be able to function even with deformed sticks. Experience has shown, however, that when using high rates of delivery of sticks, occurring in intermittent operation, high demands are placed on the construction of the carrier, in this case constituting a belt with pockets, into which the sticks are to be pressed singly from the stack of sticks. Thus, the sticks are to be pushed directly into the pockets under the action of a force applied through the stack. For this reason, this force will be continuously exerted against the belt, causing wear of the latter. As it is also necessary for the pockets formed in the belt to have a depth not exceeding the thickness of a stick in order to be able to destack one stick at a time, problems may arise in making the pockets hold sticks that are not quite straight.

Another example of the prior art is disclosed in U.S. Pat. No. 3,478,703, in which a belt is likewise used for destacking sticks singly from a stack under constant pressure, and in which use is also made of support plates at the part of the belt, in which the sticks are conveyed. In this example, the belt is adapted to run back and forth between the positions for receiving and delivering the sticks. Thus, even with this construction, there are problems related to the demands placed upon the construction of the belt and to the operating rates that may be achieved.

A general problem when using chains for destacking sticks is that these chains are subject to wear, causing particles to be transferred to the sticks and hence to the ice-cream bodies, especially when using chains of plastic material. For this reason it will be necessary to make the chains from wear-resisting material, typically stainless steel, in order to reduce the transfer of particles to a level compatible with the increasingly strict requirements relating to transfer of particles to foodstuffs, e.g. from the so-called HACCP directive coming into force in the European union in January 1996. There is, however, a drawback with using metal chains, in that the metal chains are complicated and costly to manufacture and also relatively heavy, thus reducing the operating rate that can be achieved.

Further, from DE-OS-1,601,078 it is known to single-out sticks from a number of sticks in a bin by using a chain conveying the sticks to an inserting device or a buffer store. When a buffer store is used, the sticks are periodically lifted up from the chains into the buffer store, in which the sticks are stacked by means of a wheel provided with teeth. In contrast: when the sticks are delivered from the buffer store, they will abut against the chain as in the above examples and be destacked into empty pockets on the chain by means of a pivoted rod and a stationary abutment co-operating with the pockets in the chain. For this purpose, the pockets are set at an angle. This arrangement results in a complicated construction with many moving parts, that are difficult to clean and with which it is difficult to achieve high operating rates.

A further example is disclosed in U.S. Pat. No. 1,953,506, in which the sticks are destacked using a piston rod pushing a stick out of the stack in the longitudinal direction of the stick, the latter being pushed out through an opening larger than the thickness of one stick but smaller than the thickness of two sticks. This construction requires a large abutment pressure from the stack, and also requires a strong force to eject the sticks in the longitudinal direction. At the same time, there is a risk of a stick getting jammed, which may happen when the piston rod, being thinner than the sticks, functions like a chisel and splinters the stick. Further, even this construction makes it difficult to achieve high operating rates.

Further, it is known from U.S. Pat. No. 4,105,384 (corresponding to Danish Patent Application No. 2884/75) to construct the destacking and carrier means as a sliding carriage running back and forth between the positions for receiving and delivering the sticks. In this example, the sliding carriage comprises pockets for the sticks having an oblique edge facing in the direction of forward movement and a mainly perpendicular edge facing opposite to the direction of forward movement. With this arrangement, the sticks are relatively easily placed in the pockets and lie loosely in the latter during the forward movement. When the sticks lie loosely in the pockets, there is a limit to how fast the sliding carriage with the sticks can be advanced and stopped, and time is also needed to return the carriage after having delivered the sticks.

Further, the tracks guiding the sliding carriage cause problems, as dirt may collect in them and disturb the operation, and if e.g. the dirt collects in the form of a layer in the guide track and lifts the sliding carriage, the sticks may be placed in positions offset from those desired. Still further, if the guides are twisted, e.g. caused by re-adjustment of the machine, e.g. when moving machine components, the movement of the sliding carriage may be changed and/or prevented, such as by jamming.

A further example of a method of destacking sticks may be seen in U.S. Pat. No. 4,323,336. In this example, the sticks are destacked singly by means of two oppositely placed helix wheels penetrating in between the sticks at the ends of the latter and conveying the sticks to a carrier belt and transferring them to the latter. With this method of destacking and conveying of sticks there is likewise a limit to the rates that may be achieved, and sticks that are skewed or deformed in some other way may cause problems.

DISCLOSURE OF THE INVENTION

It is the object of the present invention to provide a device for separating and conveying of sticks, in which the sticks are handled without problems, even at high rates of destacking and conveying, and even if the sticks are very much skewed or in some other manner deviate from the standard. Further, it is an object of the present invention to simplify the construction of a device of the kind referred to, in which the requirements to the components are less critical, and hence that the construction is simpler and more economical, at the same time as that it is simpler to re-adjust the device for use with differently shaped sticks, and that the durability and reliability are improved.

By using a destacking rotor according to the invention for removing the sticks from the stack, it is made possible to make the destacking element, e.g. the destacking rotor, against which the stack of sticks lies in abutment, in durable material, that does not need to be flexible and is highly wear-resistant and has a low inertia.

Further, by using a destacking rotor according to the invention for removing the sticks from the stack, cleaning becomes easier, as the destacking rotor has a simpler shape and may easily be cleaned and possibly removed, because it only needs to be secured by its shaft.

The destacking rotor may destack the sticks by an abutment surface constituted by the periphery of the rotor supporting the stick or the stack of sticks in the forward direction of movement of the stack, and when during the rotation of the rotor a recess moves past the stack, the forwardmost stick will slide into the recess, in which the stick is supported in the direction of rotation of the rotor and moved on by the latter. Thus, in contrast to chains and sliding carriages, the destacking rotor may be constructed with abutment surfaces capable of supporting the stick or the stack of sticks in the forward direction of motion of the stack, and likewise support the stick in the direction of rotation of the rotor with the requisite force without any need for complicated supports and joints in the form of tracks and/or linkages, because the destacking rotor is supported at its axis, i.e. causing low friction and a reduced risk of contamination, while achieving great strength.

When using a destacking rotor according to the invention, the sticks are not to be clamped in the rotor, the latter solely being required to support the sticks in one plane at a time in contact with the sticks, external guide means possibly providing support in other planes, e.g. at the outside of the destacking rotor, and thus providing support in a further plane or other planes, respectively, if necessary. This support in the external plane may e.g. be provided by a band, a belt or a track, such as in the manner known from the use of a wheel in a singling-out mechanism described in U.S. Pat. No. 3,478,703. In other planes in the direction of rotation, the frictional resistance and the tangential force may possibly provide the requisite support.

Further, with a preferred embodiment of the destacking rotor the sticks will have a relatively longer time in which to move through the distance from the initial position in the stack of sticks and into the recess, the latter being larger than the width of the stick, and the depth of the second support plane increases gradually relative to the direction of rotation inwards to the edge constituting the first support plane.

Still further, when the destacking rotor is constituted by two cylindrical parts with an axial interspace supporting the stick in two segments, the destacking rotor will be insensitive to skewed or otherwise distorted parts outside of the two supporting segments.

Because of the simple construction of the destacking rotor, it may in a relatively uncomplicated manner be made from wear-resisting material, e.g. with two discs in stainless steel.

Another advantage with the destacking rotor is that it can run in the same direction all the time, possibly intermittently, so that this simple construction makes it possible to achieve high operating rates. The destacking rotor may also have more than one recess. Thus, with this construction it is not necessary to provide an intermediate store adjacent to the ice-cream moulds, and there is also no loss of time by having to run the wheel or carrier back and forth, e.g. as disclosed in U.S. Pat. No. 4,105,384.

In a preferred embodiment, the destacking rotor transfers the sticks to a carrier belt, making it possible to construct the latter with deeper pockets and/or taller fingers, and/or with supports in two surfaces separated in the longitudinal direction of the sticks, thus improving the holding of skewed sticks. This makes it possible to lower the demands upon the tolerances for the sticks. As the sticks are transferred directly down into the pockets in the carrier belt, the latter is not subjected to a continuously acting force from the stack of sticks, so that wear of the belt is reduced.

Thus, with this construction it is possible to achieve fast destacking using a wear-resisting destacking rotor that does not transfer contaminant particles to the sticks, as well as fast conveying by means of a belt not subject to any significant wear, the belt having a low weight and inertia.

By in addition inserting the sticks in the carrier belt while the latter is running through a periphery of a circle and the pockets or the fingers are situated on the outside of the circle, the pockets will be open, making it easier to place the sticks in position in the pockets.

Further, as it is possible to place the embodiments of the device according to the invention "hovering" above a conveyor, the invention also provides the possibility of modernizing existing equipment without extensive conversion.

Further advantages and advantageous embodiments according to the invention will be evident from the following description.

BRIEF DESCRIPTION OF THE DRAWINGS

The invention will be explained in more detail below with reference to the drawings, in which.

DESCRIPTION OF THE PREFERRED EMBODIMENTS

Figure 1:
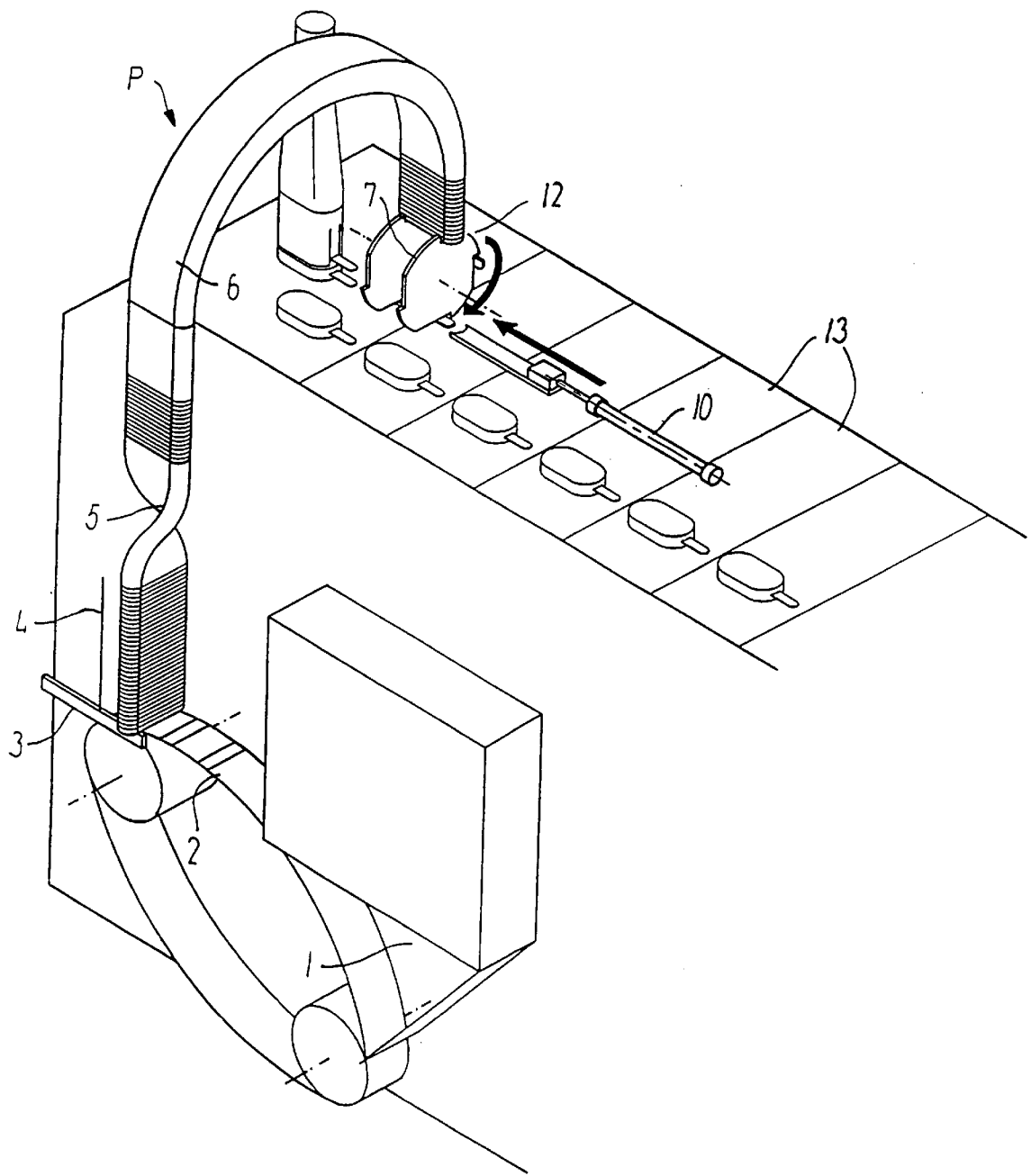
FIG. 1 shows an apparatus for inserting sticks in ice-cream bodies and comprising a destacking rotor according to the invention, in which apparatus one stick at a time is inserted in ice-cream bodies.

FIG. 1 shows an apparatus for inserting sticks into ice-lolly bodies. The sticks to be inserted are delivered from a feed bin 1 to a feed chain 2, the latter conveying the sticks outwardly to a stacking device 3 guided by a guide rail 4, so that the sticks are pushed upwardly into a stick guide P. In the stick guide P, the stack of sticks runs through a twisted segment 5, causing the sticks to change orientation relative to the feed bin 1, the latter being oriented in the longitudinal direction of the conveyor 13 shown diagrammatically in order to save space. From the segment 5, the stick guide P continues in a stick arch 6. This stick arch 6 may be arranged as a buffer store by making the arch 6 capable of parallel movement in the vertical direction, thus lengthening or shortening the path, through which the sticks are to run, and hence increasing or reducing the number of sticks in the stack. From the stick arch 6, the stick guide P leads to a destacking rotor 7. At the destacking rotor 7, the stick arch 6 and the stick guide P are terminated by an exit aperture 12 facing the rotor 7 and from which the latter can remove the sticks one by one. The destacking rotor 7 comprises at least one recess for removing sticks, said recess in the example shown constituting a support for each stick in two planes. The first plane is represented by a short, substantially radial step with a depth greater or lesser than the thickness of one stick. This depth may be adapted for removing two sticks without causing jamming of the latter. The other support plane is constituted by a plane mainly in the form of a truncated chordal plane to an imaginary cylinder coaxial with the rotor 7, the truncation coinciding with the first support plane, said two planes being at substantially right angles to each other. Thus, when the periphery of the destacking rotor 7 runs past the stack of sticks bearing against the rotor with a certain bearing force, the sticks will successively slide into the recess in front of the abutment step constituted by said first plane, and will be brought forward by the rotor 7.

When a stationary stop member (not visible in the drawing) is used in conjunction with the exit aperture 12 for retaining the sticks in the stack against the direction of rotation of the destacking rotor 7, there must be a clearance less than the thickness of one stick between this stop member and the periphery of the rotor 7. When using sticks having a thickness of 2 mm+0.1/−0.2 mm, this clearance may e.g. amount to 1.5 mm or less.

Further, if the depth of the recess in the destacking rotor 7 is substantially greater than the thickness of a stick, the device (not shown) guiding the sticks about the rotor 7 may be made with tolerances relative to the rotor 7 substantially exceeding the thickness of the sticks.

In operation, a stick to be separated from the stack will initially bear against the stick guide P in the direction of rotation of the rotor 7 and against the periphery of the latter in the direction of movement of the stack of sticks. When the rotor 7 rotates, and the recess, beginning with the chordal plane constituted by the second support plane, arrives at a position below the stack of sticks, the stick will be pushed out from the stack into the recess, and after additional rotation of the rotor 7 it will be caught by the latter's abutment step represented by the first plane.

When the sticks have e.g. a thickness of 2 mm+0.1/−0.2 mm, and the clearance between the stick guide P and the rotor 7 is 1.5 mm, a stick needs only to move through (2.0+0.2−1.5) mm=0.7 mm to be separated out, while the next stick has to move at least 1.8 mm in order to come to bear against the rotor 7.

It is, however, possible to use the device guiding the sticks about the rotor 7 to determine the tolerances, as this device may e.g. be secured to the stick guide P at the exit aperture 12 and possibly support the sticks in more than one plane, e.g. at an outer and inner periphery relative to the rotor 7, e.g. in such a manner that the stick after having been supported by the periphery of the rotor slides into the latter's recess, until it encounters a support being fixed relative to the exit aperture 12. This does not, however, mean that the tolerance requirements with regard to the position of the destacking rotor 7 are increased, the closest positional tolerances of the latter still preferably being relative to the exit aperture 12.

By constructing the destacking rotor 7 in the form of two discs as shown, and by constructing the device (not shown) guiding the sticks about the rotor 7 in the form of rails axially offset relative to the discs of the rotor, sticks e.g. being highly warped and getting jammed between the rotor 7 and the device guiding the sticks about it will be broken and ejected by the rotor 7, thus avoiding a situation leading to the operation being interrupted.

The destacking rotor 7 moves the stick downwardly to a position aligned with an ejector driven by an ejector cylinder 10. The rotor 7 may either be driven intermittently, so that the rotor stops when the stick is in an ejecting or delivery position in front of the ice-lolly body, after which the stick is pushed into the latter, or the rotor 7 may be driven continuously, so that the stick is ejected in a delivery position in front of the ice-lolly body and from there pushed into the latter. When the destacking rotor 7 is driven intermittently, its recess may advantageously be provided with a stick-supporting device at the outer periphery, e.g. in the form of a cam or an arm protruding beyond a part of the recess, said support during rotation retaining the stick against the tangential force, so that external guides for the sticks adjacent to the rotor 7 will be unnecessary.

The destacking rotor 7 may have one or a number of recesses, e.g. four as in the example shown; with this arrangement, the sticks may be moved to the ejectors at a faster rate. Since the ejector 10 is not required to carry out a separating operation, its abutment surface, with which it pushes the stick into the ice-lolly body, may have a width and a height corresponding to or greater than the thickness and width, respectively, of the stick, so as to ensure that the ejector does not act upon the stick in a chisel-like manner and splinter it. In the example shown, the ice-lolly bodies, after having received the sticks, are conveyed further by the conveyor 13.

Figure 2:
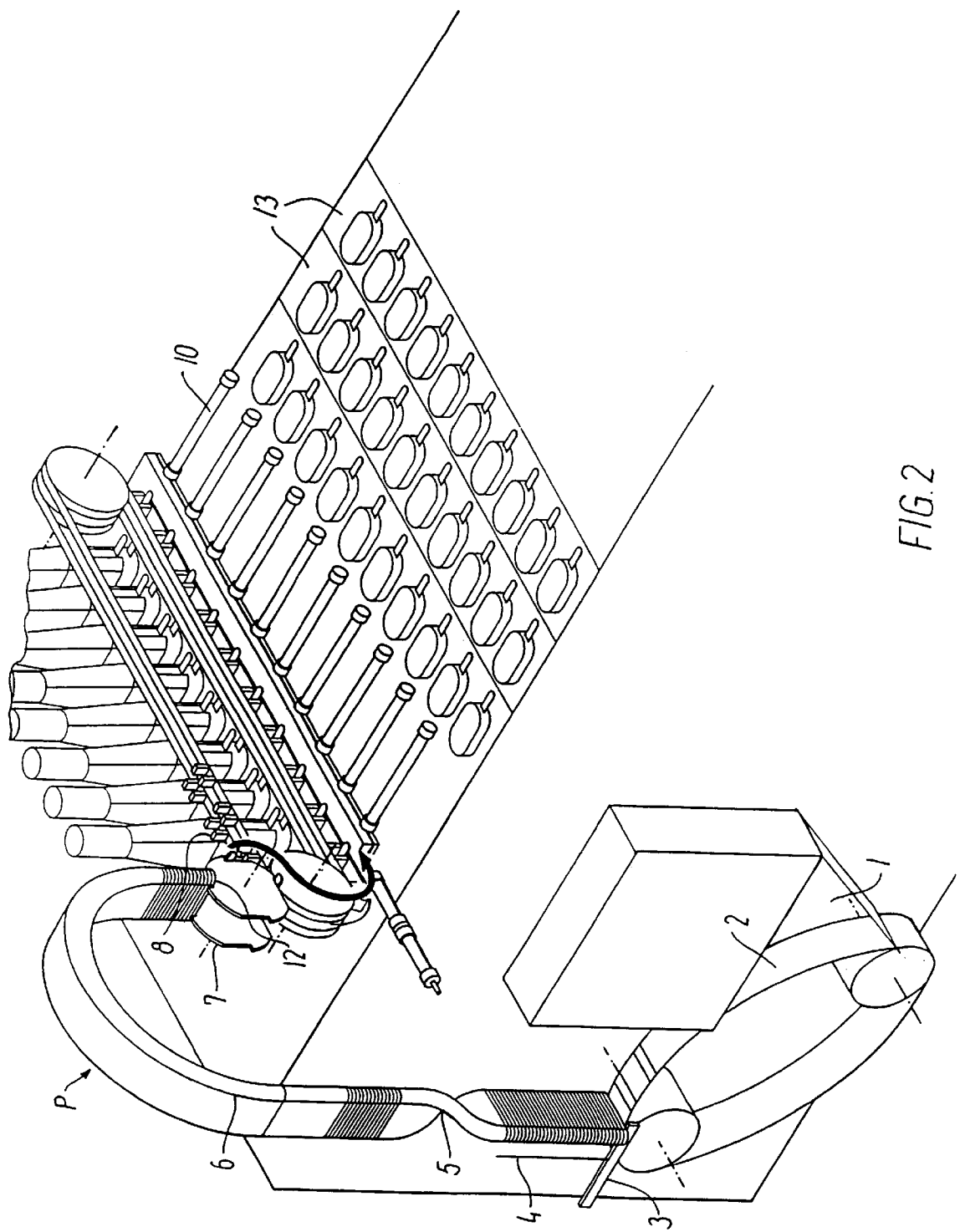
FIG. 2 shows a similar apparatus, in which a number of sticks may be inserted simultaneously in a number of ice-cream bodies.

FIG. 2 shows an apparatus for inserting sticks in ice-cream lolly bodies, in which a number of ice-lolly bodies at a time are provided with sticks. The conveying of the sticks to the destacking rotor 7 and the guiding of the sticks about the latter proceeds in the same manner as in the example described above. In the example shown in FIG. 2, however, the destacking rotor 7 delivers the sticks to a carrier belt 8 provided with pockets or fingers holding the sticks during the further conveying. In this embodiment, the fingers or pockets may have a suitable height for holding the sticks securely, since the height does not need to be adapted to the destacking function, this being taken care of by the destacking rotor 7. Thus, in contrast to what is the case with the known carrier belts, the fingers or pockets may have a height dimension substantially exceeding the thickness of a stick. In the example shown, the sticks are deposited in the pockets of the carrier belt, when these pockets are in an upper position. Then, the sticks are moved upwardly/downwardly by the carrier belt 8 to delivery positions aligned with the ice-lolly bodies, after which the sticks are pushed into these bodies. In this embodiment, the sticks may be held securely in the pockets or between the fingers by the latter clamping the sticks, or by using guide rails supporting the sticks where necessary, i.e. in the embodiment shown at the circular periphery and the lower run of the carrier belt. The carrier belt 8 and the destacking rotor 7 may be driven intermittently and/or continuously, e.g. in such a manner that the carrier belt 8 and the destacking rotor 7 run continuously while the latter is depositing the sticks in the former, and are stopped while the sticks are being pushed into the ice-lolly bodies.

The movements of the destacking rotor 7 and the carrier belt 8 may be synchronized by means of a mechanical gear interconnecting the rotor 7 and the belt 8, but may also be carried out by electronic control.

Thus, by destacking the sticks by means of a destacking rotor 7 according to the invention, a quick and reliable destacking of the sticks is achieved, as well as a quick and reliable depositing of the sticks, either in a delivery position aligned to the ice-lolly bodies, or in the pockets of a carrier. This is especially advantageous with intermittent operation, as the destacking of the sticks may often be considered as pure downtime relative to the operation of the remaining components of the apparatus. Thus, in the previously known solutions it has been necessary to provide intermediate storage of the sticks close to the ice-lolly bodies in order to achieve a sufficiently fast operating rate, e.g. as seen in U.S. Pat. No. 4,105,384, in which two sticks per mould are destacked at a time; to make the carriage bring the sticks to the moulds; or to convey the sticks along plural paths, such as is evident from DK patent publication No. 167,836.

When using a carrier belt 8 it may be advantageous to deposit the sticks in the pockets of the carrier belt during the movement of the pockets in a circular periphery on the outside of a carrier-belt pulley, so that the pockets are opened or the fingers are moved away from each other, making it easier to deposit the sticks in the pockets, the opening movement of the fingers increasing the tolerance. In the example shown in FIG. 2, this is achieved by depositing the sticks on the belt 8 in the latter's upper run immediately downstream of the initial movement on the circular periphery about the carrier belt-pulley.

In the embodiment shown in FIG. 2, the sticks having been deposited on the carrier belt 8 are guided downwardly to the lower run of the belt. It is, however, also possible to let the sticks be guided in the upper run. If so, the rotor 7 is turned around and its direction of rotation reversed. When the sticks are guided along and pushed out from the upper run, the pockets or fingers may have larger openings in or between them, respectively, so that the sticks lie loosely on the belt without there being any need for guide rails.

An extra feed bin with a destacking rotor (not shown) corresponding to the rotor 7 could possibly be added at the opposite end of the carrier belt 8, so that the rotor at this opposite end may deposit the sticks on the carrier belt in the same manner as described previously. It is also possible to reverse the direction of movement of the belt, if the extra bin is used as a replacement for the first bin 1.

The destacking rotor 7 itself may be made of a material having good wear properties, such as metal, plastic etc. If a carrier belt 8 is used, it may be made of a suitable flexible material, and it does not need to have special wear surfaces. At the same time, the belt may have taller fingers or deeper pockets, so that especially deformed sticks can be held more securely than with the previously known belts.

The carrier belt 8 may advantageously be constructed as a toothed belt which may have embedded steel bands or steel wires in order to provide it with a high dimensional stability in the longitudinal direction. On this belt, the pockets or fingers may be secured adhesively, by welding, possibly high-frequency welding etc.

Compared to chains, such a belt does not require lubrication to increase its lifetime, and its length does not change as a consequence of wear on the bearings. This gives the belt 8 a longer life, reduces the need for maintenance work and makes cleaning easier, this being advantageous especially in the foodstuffs industry, in which the use of lubricants may be problematic, and linkages etc. may accumulate contaminants that are difficult to remove by cleaning.

Further, it is possible to adapt the carrier belt to the sticks and ice moulds used at any time by attaching pockets or fingers to a base belt, that may be a commercially available standard belt. Thus, the only adaptation to be carried out relates to the shape and placing of the pockets or fingers, in contrast to chains or sliding carriages, frequently requiring the whole chain or carriage to be tailored to fit with each task.

Further, the apparatus may be adapted for use with differently shaped sticks and/or ice moulds, merely by replacing the carrier belt 8 and/or the destacking rotor 7 with a different belt and/or rotor, respectively.

Thus, in addition, by using a destacking rotor according to the invention it is achieved that the requirements with regard to the materials for the various parts do not contradict each other; the belt 8 may be made of a flexible material and the rotor 7 may be made from a wear-resisting non-flexible material, at the same time as the apparatus is reliable when operating at high operating rates.

The feeding and guiding of the sticks may, of course, be achieved in a manner differing from what is shown and described. The essential feature is that the sticks are delivered to the rotor from a stack of sticks. Other examples of stick bins and stick-guiding arrangements may be seen in the publications referred to. Further, the supporting in the third plane adjacent to the rotor may be realized in different ways, e.g. using detachable belts as shown for a stick-destacking rotor in U.S. Pat. No. 3,478,703.

I claim:

1. A device for separating and conveying sticks in an apparatus for inserting sticks in ice-lolly bodies in which the sticks are supplied in the form of an elongate stack of sticks in a guide having an exit aperture, said device comprising:

at least one destacking rotor for destacking the sticks at the exit aperture and for transferring the sticks therefrom singly, said rotor comprising at least one recess shaped and dimensioned to destack one stick from the stack of sticks at the exit aperture; and a carrier moving past the exit aperture of the guide to which the sticks destacked by said destacking rotor are transferred by said destacking rotor, the sticks being carried by said carrier to ice-cream moulds and placed in a delivery position aligned to the ice-lolly bodies, said carrier including a belt having a means for receiving the sticks transferred by said destacking rotor.

2. A device according to claim 1, wherein an edge plane in each recess in the destacking rotor constitutes a first support plane and at least approximately constitutes a meridian plane in the rotor and has a radial extent adapted to the thickness of the sticks to be destacked while acted upon by said edge plane.

3. A device according to claim 2, wherein a plane surface in each recess in the destacking rotor constitutes a second support plane extending mainly as a truncated chordal plane from the periphery of the rotor to the edge plane constituting said first support plane.

4. A device according to claim 1, wherein the destacking rotor comprises two generally disc-shaped parts axially mutually spaced to provide an interspace therebetween, so that the sticks are supported by said disc-shaped parts.

5. A device according to claim 1, wherein the destacking rotor is made of wear-resisting material.

6. A device according to claim 1, wherein the destacking rotor is adapted to be driven intermittently.

7. A device according to claim 1, wherein the destacking rotor is adapted to be driven continuously.

8. A device according to claim 1, wherein the belt of the carrier has a run including an arcuate portion, wherein the destacking rotor is adapted to deliver the sticks to the carrier at a position immediately upstream of the arcuate portion, and wherein the receiving means on the carrier for receiving the sticks are situated on the outside of the arcuate portion wherein the receiving means are made to open to facilitate the receiving of the sticks.

9. A device according to claim 1, wherein the carrier is in the form of an endless belt.

10. A device according to claim 1, wherein the dimension of the receiving means on the carrier as measured at right angles to the latter is greater than the thickness of the sticks.

11. A device according to claim 1, wherein the carrier comprises two supporting surfaces adapted to support the sticks in two regions adjacent to the receiving means and having a distance between said two supporting surfaces in the longitudinal direction of the sticks received in the receiving means.

12. A device for separating and conveying ice-lolly sticks having a flat rectangular cross-section comprising:

a guide means for supplying the ice-lolly sticks as an elongated stack of ice-lolly sticks, the guide means having an exit aperture, at least one destacking rotor at the exit aperture of the guide means, for destacking the ice-lolly sticks at the exit aperture, said destacking rotor including at least one recess shaped and dimensioned to destack one ice-lolly stick from said stack of ice-lolly sticks, said recess having (a) an edge plane that constitutes a first support plane which at least approximately constitutes a meridian plane in the destacking rotor and that has a radial extent adapted to the thickness of the ice-lolly sticks to be destacked while acted upon by said edge plane, and (b) a plane surface that constitutes a second support plane extending mainly as a truncated chordal plane surface from the periphery of the destacking rotor to the edge plane constituting the first support plane, the transition from the periphery of the destacking rotor to the chordal plane surface being smooth, and a carrier including a belt having a means for receiving the sticks, said destacking rotor being adapted to deliver the sticks to the belt, after which the carrier conveys the sticks to a delivery position for insertion in ice-lolly bodies.

13. A device according to claim 12, wherein the destacking rotor comprises two generally disc-shaped parts axially mutually spaced to provide an interspace therebetween, so that the sticks are supported by said disc-shaped parts.

14. A device according to claim 12, wherein the destacking rotor is made of wear-resisting material.

15. A device according to claim 12, wherein the destacking rotor is adapted to be driven intermittently.

16. A device according to claim 12, wherein the destacking rotor is adapted to be driven continuously.

17. A device according to claim 12, wherein the belt of the carrier has a run including an arcuate portion, wherein the destacking rotor is adapted to deliver the sticks to the carrier at a position immediately upstream of the arcuate portion, and wherein the receiving means on the carrier for receiving the sticks are situated on the outside of the arcuate portion whereby the receiving means are made to open to facilitate the receiving of the sticks.

18. A device according to claim 12, wherein the belt of the carrier is an endless belt.

19. A device according to claim 12, wherein the depth dimension of the receiving means on the carrier is greater than the thickness of the sticks.

20. A device according to claim 12, wherein the carrier comprises two supporting surfaces adapted to support the sticks in two regions adjacent to the receiving means and having a distance between said two supporting surfaces in the longitudinal direction of the sticks received in the receiving means.

* * * * *